3,022,208
REINFORCING ELEMENT BONDED WITH A CURED MIXTURE OF A BUTADIENE POLYMER AND DIETHYL FUMARATE, AND PROCESS FOR PREPARING SAME
Byron M. Vanderbilt, Westfield, N.J., assignor to Esso Research and Engineering Company, a corporation of Delaware
No Drawing. Filed Oct. 13, 1958, Ser. No. 766,723
4 Claims. (Cl. 154—43)

This invention relates to a process for making synthetic resins and more particularly relates to a process for making synthetic resins useful for castings and reinforced plastics and laminates, using butadiene polymers and copolymers as the bonding agent.

It is known that linear polymers and copolymers of butadiene of an oily or rubber-like consistency can be cured at temperatures of 435°–750° F. to form resins. These resins are similar to hard rubber except that no vulcanizing agent is used in their preparation. The products are characterized by having superior electrical properties. When prepared from a highly purified GR-S rubber they possess a power factor of about 0.0005 at $10^6$ to $10^9$ cycles and have therefore found use as an insulation material for radar equipment. They are also resistant to chemical action and physical impact.

Such resins can be easily made by heating the polymers of butadiene or copolymers of butadiene and styrene at temperatures from 210°–345° F. in the presence of 2.0 to 10% or more of ditertiary butyl peroxide as described in U.S. Patent 2,772,254, filed January 30, 1953, in the names of Anthony H. Gleason and Joseph F. Nelson. However, the resins formed are generally opaque and the time required for setting are too long for commercial application.

It has now been found that the hardness and particularly the clarity of such resins can be improved and a larger number of peroxide catalysts can be used by heating the oily polymers in the presence of 20–50% of an alkyl fumarate. In addition the time required for setting the resin is reduced to minutes.

The polymers to which the present invention is primarily applicable are those prepared by copolymerizing 100 to 50 parts of butadiene-1,3 and 0 to 50 parts of styrene with sodium. A particularly suitable polymer is an oily copolymer of 75 to 85% butadiene and 15 to 25% styrene. The polymerization is carried out in a reaction diluent at temperatures ranging from about 25 to 95° C., or preferably between 40 and 90° C., and is desirably continued until complete conversion of monomers is obtained. About 1.2 to 5 parts, preferably 1.5 to 4 parts, of finely divided metallic sodium per 100 parts of monomers are used as catalyst. Materials used as diluents in the polymerization are inert hydrocarbons which remain liquid under the reaction conditions employed. Accordingly, the diluents employed have a boiling point between about 10 and 200° C., the low boiling diluents being useful where it is permissible to keep the reaction pressure sufficiently high to maintain the diluent in liquid condition at the reaction temperature used.

Preferred diluents are essentially aliphatic hydrocarbons such as naphtha having a boiling range between about 90 and 120° C., or straight-run mineral spirits such as "Varsol" having a boiling range between about 150 and 200° C., butane, benzene, cyclohexane, xylenes, toluenes, pentanes and similar inert hydrocarbons are also useful, individually or in admixture with each other. The hydrocarbon diluents are used in amounts ranging from 100 to 500, preferably 150 to 300 parts per 100 parts of monomers. In other words, the resulting oily composition as synthesized normally contains about 20% to 50% of the polymer dissolved in a hydrocarbon solvent. When desired, more concentrated compositions can be produced from the synthesis product by stripping off excess solvent. For purposes of the present invention, it is desirable to concentrate non-volatile matter to at least 90 and preferably 100%. The presence of solvent is unnecessary and is undesirable except in small amounts.

Furthermore, to promote the original polymerization reaction and to assure the formation of a light-colored product, it is also desirable to employ in the polymerization about 10 to 40 or more parts of an ether promoter per 100 parts of monomers. Cyclic diethers of 4 to 8 carbon atoms having an —O—C—C—O— group, such as dioxane-1,4 and its methyl and ethyl homologues, have been found as particularly effective promoters. Other suitable ether promoters are aliphatic mono- or di-ethers of 4 to 8 carbon atoms, such as diethyl ether, diethyl ether of ethylene glycol, and diethyl ether of diethylene glycol. Finally, it is also beneficial in many cases, although not essential, to use about 5 to 35 weight percent (based on sodium) of an alcohol such as methanol, isopropanol or n-amyl alcohol, especially where the sodium catalyst particles are relatively coarse.

The resulting product may vary from a low viscosity oil to a solid high molecular weight polymer and the invention is equally applicable to any such product of whatever intrinsic viscosity.

The present invention is based on the discovery that when products of the nature described above are heated in the presence of 20–50% of an alkyl fumarate as cross-linking agent and a peroxide, hard insoluble thermosetting resins can be obtained. Temperatures may range from 220° to 280° F. Although suitable for many uses, the cure may not be final at these temperatures. Therefore, a post cure of up to 350° F. may be necessary if complete cure and maximum physical properties are desired.

The invention is particularly effective in the preparation of reinforced plastic structures. Such a structure can be provided by laminating a reinforcing element with a resin mix composed of polymer, alkyl fumarate, and peroxide. A laminate, according to this invention, is defined as a composite mass of a reinforcing agent and a thermosetting resin. This, therefore, includes layers of cloth and resin; fibers embedded in a resin; and fibers saturated with resin and formed in a hollow cylindrical pipe. Accordingly, lamination can be accomplished by any known method. For example, the resin mix can be combined with glass fibers by brush impregnation; by being poured onto several plies of glass cloth or matting assembled on plates, molds, and other lay up operations, preferably covered with a lubricant, a non-adhesive film or other release agent; and by dipping the cloth or rovings into the resin mix.

The reinforcing agents that are applicable to this invention include such items as mineral materials, e.g., glass, asbestos, mica, rock, and celite; vegetable materials, e.g., cotton, linen, rayon, and silk; organic materials, e.g., hair, nylon, and orlon; and metallic materials, e.g., iron, aluminum, and copper. However, the preferred material is glass fiber. It is within the scope of this invention to use glass fiber which has been treated with an unsaturated organic halo silane, having the formula $R_nSiX_{4-n}$ where R is vinyl or allyl group, $n$ is a positive integer equal to 1, 2, or 3, and X is halogen. It is preferred to employ those silanes wherein $n$ is equal to 1, i.e., those containing 3 atoms of halogen substituted on the silicon. It is believed that the above-described chlorosilanes react with the hydroxyl groups in the glass, liberating hydrogen chloride. The silane may also be added to the glass as an aqueous solution of a hydrolyzed ester. The unsaturated or vinyl portion of the molecule thus bound to the glass through the silicon atom reacts with the unsaturated liquid polymer oil described above during the curing step, thus effectively bonding the curable liquid and the glass fiber. The silane may also be added in solution in the polymer in the form of its ester. Reinforcing agents may be used up to 80% of the reinforced plastic, preferably 30–70%.

It is one of the features of the present invention that the use of the fumarate esters as crosslinking agents for the butadiene polymer enables a larger number of peroxide catalysts to be used than has heretofore been possible. Suitable catalysts include dicumyl peroxide, ditertiary butyl peroxide, benzoyl peroxide, tertiary butyl perbenzoate, cumene hydroperoxide, tertiary butyl phthalate or other peresters or the mixtures of any of these. These peroxides may be used in proportions of 2 to 10% by weight of the butadiene polymer-fumarate mixture.

The fast rate of setting at moderate temperatures of the polymer-alkyl fumarate blends of this invention make them particularly suitable for making reinforced plastics or laminates.

One method used in the manufacture of solid rectangular sheets, is to form layers of curable polymer mix and glass fiber. After the desired thickness is obtained, the sheet is cured to a unitary reinforced plastic. Another method can be used for the manufacture of cylindrical hollow pipes. Glass fibers can be dipped in the curable polymer mix and wound about a steel mandrel. This can be accomplished by any method. In one method, the fiber rovings, e.g., glass fibers, are wound at an angle to the axis of the mandrel circumferentially in superimposed layers to form a peripheral shell of the pipe (U.S. Patent 2,714,414). A suitable angle is that described in U.S. Patent 2,747,626 where the angle A is determined by the equation $3 \sin^2 a + (2/m) \sin a = 1$ in which $m$ is the ratio of the total cross-sectional area of all the helically disposed fibers to the total cross-sectional area of all the longitudinally disposed fibers. After the desired shape is obtained, the wrapping can be cured to form the unitary rigid pipe.

The alkyl fumarates used as crosslinking agents are specific for this invention. The corresponding maleates and other esters will not crosslink with the butadiene polymer to form hard resins suitable either for castings or laminates. Suitable fumarates include diethyl fumarate, diisopropyl fumarate and di-n-butyl fumarate. The ratio of fumarate ester to butadiene polymer may vary from 20 parts by weight of ester and 80 parts by weight of butadiene polymer to 50 parts by weight of each. However, best results are obtained by the use of about 70 parts by weight of polymer to 30 parts by weight of ester.

The following examples illustrate the benefits to be obtained by the process of this invention.

Example 1

An oily copolymer of butadiene and styrene was prepared according to the following recipe:

| | Parts by weight |
|---|---|
| Butadiene | 80 |
| Styrene | 20 |
| Naphtha | 200 |
| Dioxane | 30 |
| Sodium | 1.5 |
| Isopropanol | 0.3 |
| Temperature, 50° C. | |

Complete conversion was obtained in eight hours. The catalyst was destroyed by filtering through Attapulgus clay. The product was finished to contain 100% non-volatile matter as described above and had a viscosity of 1.4 poise at 50% N.V.M.

Example 2

Equal mixtures by weight were prepared of the copolymer of Example 1 and the following materials: (1) vinyl toluene, (2) diethyl fumarate and (3) diethyl maleate. To each was added two parts by weight of dicumyl peroxide per 100 parts of the binary mixture. Three ccs. of each mixture was then heated in a test tube immersed in an oil bath held at 250° F. and the time required to solidify the mixture was observed. The following results were obtained:

| Blend | Min. to Set | Appearance |
|---|---|---|
| Vinyl Toluene | 25 | Milky. |
| Diethyl Fumarate | 19 | Clear. |
| Diethyl Maleate | 25 | Clear. |

Each of the mixtures was heated for an additional hour at 250° F. in the test tube, removed and heated an additional one hour at 300° F. in a hot air oven. The resins were then examined and the following observations made:

| Blend | Properties |
|---|---|
| Vinyl Toluene | Hard—Opaque. |
| Diethyl Fumarate | Very Hard—Clear. |
| Diethyl Maleate | Soft and Factice-like. |

The above data clearly show that diethyl fumarate is a more effective crosslinking agent than is vinyl toluene at this temperature in that a faster cure rate is obtained and also by the fact that a true copolymer is obtained as evidenced by the clarity of the set resin. The inferiority of the maleate ester is obvious since the final resin is soft.

Example 3

The copolymer of Example 1 was blended in different proportions with diethyl fumarate, two parts of dicumyl peroxide added to each 100 parts of blend and a portion of each heated as in Example 2 and if set after one hour in test tube it was heated an additional hour at 300° F. The following results were obtained:

| Polymer/Ester Ratio | Time to Set | Properties of Final Cured Resin |
|---|---|---|
| 100/0 | >1 Hr | Liquid. |
| 90/10 | 1 Hr | Semi-solid. |
| 80/20 | 26 Min | Hard. |
| 70/30 | 15 Min | Very Hard. |
| 60/40 | 18 Min | Hard. |
| 50/50 | 19 Min | Hard. |
| 40/60 | 23 Min | Cheese-like. |
| 0/100 | >1 Hr | Liquid. |

The above data show that the fumarate ester can be used in the polymer only between the ratios of about 80 polymer to 20 ester and 50 polymer to 50 ester. Neither pure polymer nor pure ester solidified within the first hour of heating.

Example 4

A blend of the polymer of Example 1 and diethyl fumarate in a 2/1 ratio, containing two parts of benzoyl peroxide solidified to a clear solid on heating at 220° F. for only 5 minutes. A 3/1 ratio of reactants containing 1.5 parts of benzoyl peroxide solidified under like conditions in 8 minutes.

Example 5

A 60/40 mixture of the polymer of Example 1 and diethyl fumarate, containing two parts of tertiary butyl perbenzoate was slowly heated starting at room temperature. On reaching 220° F. the mixture solidified. The casting was then heated an additional 45 minutes at 220° F. at which time the resin had been converted to a hard resilient plastic.

Example 6

The polymer of Example 1 was blended separately with diethyl fumarate and diisopropyl fumarate in a ratio of 70 parts by weight of polymer to 30 parts of ester. To each blend was added 2.8 parts of dicumyl peroxide per 100 parts of reactants. Samples of each were heated at 260° F. in test tubes in an oil bath. The blend containing diethyl fumarate solidified in 13 minutes while that containing the diisopropyl fumarate required 29 minutes. However, on further heating of each casting at 300° F. for three hours, both gave hard, clear resins.

Similarly, di-normal butyl fumarate was found to give clear, hard resins when heated with the copolymer of Example 1.

Example 7

A blend of 60 parts by weight of the copolymer of Example 1 and 40 parts of diethyl fumarate, containing 4 parts of dicumyl peroxide was prepared and used to impregnate 14 plies of #181 glass cloth. The resulting laminate was cured for one hour at 250° F. in a 0.125-inch deep mold after which it was removed and post cured at a temperature of 300° F. for one hour. The finished laminate thus obtained was translucent and was of excellent appearance. Upon testing it was found to have a flexural strength of 54,000 p.s.i.

Example 8

The experiment of Example 7 was repeated using 80 parts by weight of the copolymer and 20 parts of diethyl fumarate. The mixture was cured in the mold for one hour at 275° F. It was then removed from the mold and cured in a hot air oven at 300° F. for one hour. Specimens (½ inch by ⅛ inch by 3 inches) were cut, some of which were further cured at 300° and tested for flexural strength after various time intervals (ASTM D-790-49T) until the flexural strength failed to increase. Each sample was also tested to determine its ability to support a sustained load when exposed to warm water. In this test each sample was supported over a 2-inch open span and immersed in a constant temperature bath at 170° F. under a load of 75 lbs. (28,800 p.s.i.) until the specimen failed. The following data were obtained:

| Curing Time, Hrs. | Flexural Strength, p.s.i. | Time to Failure Minutes |
|---|---|---|
| 1 | 57,000 | |
| 5 | 61,000 | |
| 9 | 57,000 | |
| 17 | 67,000 | 55 |
| 33 | 67,000 | 42 |

The above data show that high flexural strength (57,000 p.s.i.) can be obtained after only two hours of total curing time.

The nature of the present invention having been thus fully set forth and specific examples of the same given, what is claimed as new and useful and desired to be secured by Letters Patent is:

1. In a process for preparing a reinforced plastic, the improvement which comprises laminating a reinforcing element with a resinifiable polymer mix comprising 80-50% by weight of a butadiene polymer of 100 to 50% butadiene-1,3 and 0 to 50% styrene and 20-50% by weight of diethyl fumarate and curing said laminate at a temperature between 220° and 350° F. in the presence of a peroxide catalyst to provide a unitary product.

2. Process according to claim 1 in which the reinforcing element is glass cloth.

3. A reinforced plastic comprising a reinforcing element bonded with a cured mixture of 50-80 parts by weight of a butadiene polymer of 100 to 50% butadiene-1,3 and 0 to 50% styrene and 20-50 parts by weight of diethyl fumarate.

4. A reinforced plastic comprising glass fiber bonded with a cured mixture of 50-80 parts by weight of a butadiene polymer of 100 to 50% butadiene-1,3 and 0 to 50% styrene and 20-50 parts by weight of diethyl fumarate.

References Cited in the file of this patent

UNITED STATES PATENTS

| 2,772,254 | Gleason et al. | Nov. 27, 1956 |
| 2,903,440 | Heiligmann | Sept. 8, 1959 |

OTHER REFERENCES

Crouch et al.: "Industrial and Engineering Chemistry," volume 47, No. 10, October 1955, pages 2091-2095.